Jan. 18, 1955 A. SATTILARO 2,699,640
HOE ATTACHMENT FOR GARDEN RAKES
Filed Nov. 19, 1952
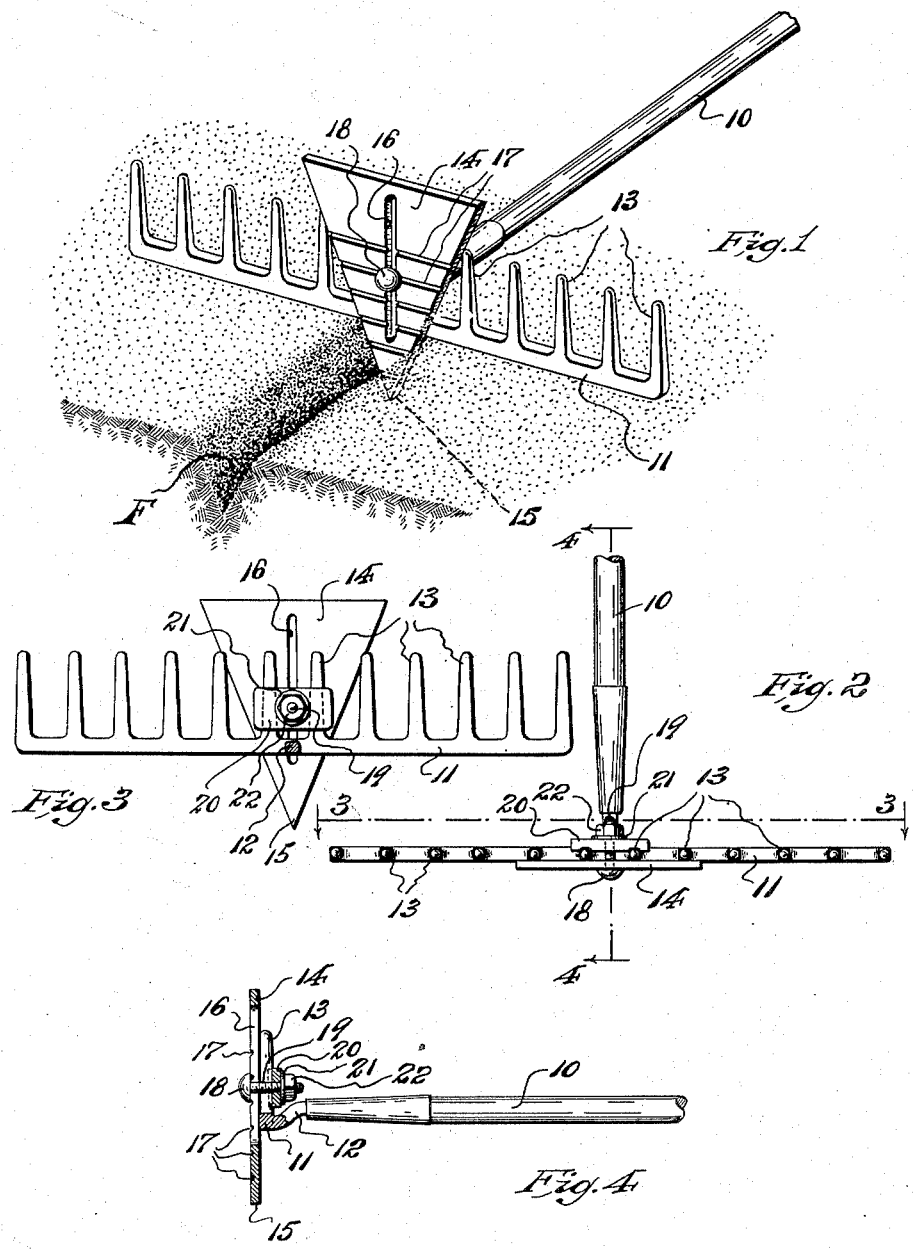
INVENTOR.
Andrew Sattilaro,
BY
George D. Richards
Attorney

# United States Patent Office 2,699,640
Patented Jan. 18, 1955

2,699,640

HOE ATTACHMENT FOR GARDEN RAKES

Andrew Sattilaro, Metuchen, N. J.

Application November 19, 1952, Serial No. 321,440

3 Claims. (Cl. 56—400.06)

This invention relates to an improved gardening tool and, more particularly, to an attachment applicable to a rake, whereby to condition the latter for use in forming furrows for the reception of seeds when planting the same, and also for conditioning the rake for use as a soil hoeing and cultivating implement.

The invention has for an object to provide a triangular hoe blade which is adapted to be adjustably affixed to a rake head so that its apex end projects from the back bar thereof when the rake is inverted; the hoe blade being provided with means cooperative with the rake head, whereby the apex end of the attached hoe blade can be adjustably projected at a selected distance from said rake back bar, according to a desired depth of seed reception furrow to be formed by drawing said hoe blade through the soil to be planted, and whereby, during such operation, the back bar of the rake, as it rides over the surface of said soil, limits the soil penetration of the hoe blade to a depth which is predetermined by the setting of said hoe blade in the selected position to which it is adjusted and affixed relative to said rake head.

The invention has for a further object to provide a hoe blade which is adapted to be so adjustably affixed to a rake head that it can be optionally positioned and used either to form furrows for the planting of seeds, or subject to ordinary use as a soil loosening or cultivating tool, or as a weeder in carrying out various gardening operations.

The above and other objects of this invention will be understood from a reading of the following detailed description of the invention in connection with the accompanying drawings, in which:

Fig. 1 is a perspective view of the rake and hoe blade attachment therefor, with the latter adjustably affixed to the rake for use in forming a seed planting furrow of predetermined depth in soil to be planted; Fig. 2 is a top plan view of the rake and attached hoe blade; Fig. 3 is a vertical transverse sectional view, taken on line 3—3 in Fig. 2; and Fig. 4 is a longitudinal sectional view, taken on line 4—4 in Fig. 2.

Similar characters of reference are employed in the above described views, to indicate corresponding parts.

Referring to the drawings, the reference character 10 indicates the usual elongated handle of a rake, said rake comprising a head formed by a back bar 11, the shank 12 of which is affixed to said handle 10 in any conventional manner, said rake head having a plurality of rake tines or teeth 13 spaced along and projecting therefrom at right angles thereto.

The reference character 14 indicates the body of a hoe blade which is adapted to be attached to the rake head. This hoe blade body is of triangular peripheral shape, whereby to provide a pointed apex end portion 15. The hoe blade body is provided with a medial longitudinal slot 16 perpendicular to its base and of suitable length in extension between said base and apex end portion. The front face of the hoe blade body is provided with a series of suitably formed transverse graduations or guide marks 17, which are disposed in relatively spaced relation to the apex end of said hoe blade body, as, for example, one inch apart. Extending through said slot 16 is an attachment bolt, the head 18 of which bears against the outer or front face of the hoe blade body, so that its threaded shank 19 projects rearwardly from the hoe blade body. The free end portion of the attachment bolt shank 19 engages through a perforate clamp plate 20, so that its projecting end can receive a washer 21 and fastening nut 22, whereby to fasten the hoe blade body to a rake head in the manner now about to be described.

To operatively apply the hoe blade body 14 to the rake, the head of the latter is inverted so that its back bar 11 is downwardly directed with the tines or teeth 13 upstanding therefrom. The hoe blade body 14 is applied to the mid portion of the rake head with its rear face abutting the outer face of the latter, so that the apex end portion 15 of said hoe blade body is directed in downward extension relative to the back bar 11 of said rake head, and so that the slot 16 of said hoe body is aligned between a pair of the medial upstanding tines or teeth 13 of the rake head. The shank 19 of the attachment bolt thereupon passes rearwardly between said medial tines or teeth. The clamp plate 20, as engaged over the shank 19 of the attachment bolt, is abutted against the rear faces of said medial tines or teeth 13, whereupon the fastening nut 22 is screwed home on said shank 19 and against the rear face of the clamp plate 20, thus clamping the assembly in fixed relation to said medial tines or teeth 13, and thereby affixing the hoe blade body in its operative attached relation to the rake head.

Assuming, for example, it is desired to use the hoe blade body to form, in the soil being worked, a seed planting furrow having a depth of three inches, before tightening the hoe blade body in affixed relation to the rake head, said hoe blade body is adjusted to align its third inch graduation or guide mark 17 with the bottom edge of the rake back bar 11, so that the apex end portion 15 of the hoe body freely projects three inches below the bottom edge level of the rake back bar. The hoe blade body being fixed in such attached relation to the rake head, the tool is now ready for use to perform the operation of forming, in the soil to be worked, a seed planting furrow of the selected predetermined depth of three inches. To accomplish the furrow producing operation, the back bar 11 of the rake head is caused to abut the top level surface of the soil to be worked, so that the apex end portion 15 of the hoe blade body is caused to penetrate said soil only for a depth of three inches. The tool having been thus applied to the soil to be worked, the back bar 11 of the rake head is drawn over the surface of said soil, thus advancing the apex end portion 15 of the hoe blade body through the soil, whereby to produce the desired seed reception furrow F of the selected depth (see Fig. 1). It will be obvious that, in such operation the back bar 11 of the rake head, as it rides over the surface of the soil under treatment, serves to guage soil depth penetration of the hoe blade body, and thus to limit it to the desired selected depth of furrow forming effect. By reason of such guaging and depth limiting effect of the rake head back bar, it will also be obvious that the furrow formed by the operation will be of uniform depth throughout its length, and that the length of said furrow can extend to any distance desired.

It will be understood that the hoe blade body may be readily and quickly adjusted, as to its attached relation to the rake head, whereby to vary at will the extent of projection of its apex end portion 15 according to the depth of seed planting furrow desired or required to be formed. It will also be understood that, when it is desired to use the hoe blade body for other gardening operations, the hoe blade body may be quickly and easily adjusted to project a maximum extent thereof from the back bar 11 of the rake head.

It will be further apparent that, when it is desired to use the rake for raking operations, the hoe blade body can be quickly removed from the rake head and laid aside until further use thereof is again required.

Having now described my invention, I claim:

1. In combination with an inverted head of a rake having a back bar with teeth extending therefrom, a triangular hoe blade on the front face of said rake head in contact with said bar and said teeth and with an apex portion thereof projecting beyond said back bar, and means adjustably interconnecting said hoe blade and said rake head, whereby to affix the hoe blade to the rake head so as to dispose the apex end portion of the former at selected distance of projection below the back bar of the latter according to depth of penetration desired to be effected by said apex end portion in use, as limited by contact of said back bar with and movement thereof over the surface level of the soil when forming a planting furrow of selected depth for seed reception.

2. The combination according to claim 1 wherein the hoe blade is provided with a plurality of transverse guide marks on a face thereof in vertically spaced relation to its apex end and adapted to be selectively registered with the back bar of the rake head to determine a desired given distance of projection of said apex end beyond the latter.

3. The combination according to claim 1 wherein the means adjustably interconnecting the hoe blade to the rake head comprises a perforate clamp plate abutting the rear face of the rake head in bridging relation to medial teeth of said rake head, said hoe blade having a central longitudinal slot of substantial length and fastening bolt means engageable through the hoe plate slot and said clamp plate in extension between said medial teeth of the rake head.

References Cited in the file of this patent

UNITED STATES PATENTS

| | | |
|---|---|---|
| 1,246,577 | Fleming | Nov. 13, 1917 |
| 1,296,202 | Miller | Mar. 4, 1919 |
| 1,878,553 | Todd | Sept. 20, 1932 |
| 2,437,805 | Chilcote | Mar. 16, 1948 |